United States Patent [19]

Misawa et al.

[11] Patent Number: 4,819,704
[45] Date of Patent: Apr. 11, 1989

[54] RADIAL TIRE HAVING REDUCED PLY STEER

[75] Inventors: Makoto Misawa; Shinji Kawakami; Ryoji Hanada, all of Hiratsuka, Japan

[73] Assignee: The Yokohama Rubber Co., Ltd., Tokyo, Japan

[21] Appl. No.: 62,981

[22] Filed: Jun. 17, 1987

[30] Foreign Application Priority Data

Jul. 4, 1986 [JP] Japan ................. 61-156129

[51] Int. Cl.$^4$ .................. B60C 9/18; B60C 11/11
[52] U.S. Cl. .................. 152/209 R; 152/526
[58] Field of Search .......... 152/209 R, 209 A, 209 D, 152/526, 534-536

[56] References Cited

U.S. PATENT DOCUMENTS

| | | | |
|---|---|---|---|
| 3,945,422 | 3/1976 | Pottinger | 152/527 |
| 4,194,548 | 3/1980 | Roger | 152/209 R |
| 4,469,157 | 9/1984 | Morikawa et al. | 152/527 |
| 4,732,194 | 3/1988 | Saneto et al. | 152/209 A |

FOREIGN PATENT DOCUMENTS 0055902  5/1979  Japan.
57-114704  7/1982  Japan.
60-234003  11/1985  Japan.

*Primary Examiner*—Michael W. Ball
*Assistant Examiner*—Geoffrey L. Knable
*Attorney, Agent, or Firm*—Armstrong, Nikaido Marmelstein & Kubovcik

[57] ABSTRACT

A radial tire wherein part or the whole of the blocks present on the tread area have an angle $\theta$ of the direction in which the maximum shear rigidity is attained relative to the circumferential direction of the tire in the range of $40° \leq \theta \leq 75°$, the direction in which the maximum shear rigidity of said block is attained and the direction of the cords of the outermost belt layer are opposite to each other with respect to the circumferential direction of the tire, the ratio of the maximum shear rigidity of said block to the minimum shear rigidity of said block is in the range from 1.4 to 1.8, and the total area of the block is 65% or more based on the total area of all the blocks.

4 Claims, 9 Drawing Sheets

RADIAL TIRE HAVING REDUCED PLY STEER

BACKGROUND OF THE INVENTION

This invention relates to a radial tire improved in the stability during straight travelling through reduction in ply steer.

The radial tire for passenger cars was conventionally formed by interposing at least two belt layers between a tread and a carcass layer in the direction substantially parallel to the circumferential direction of the tire. The reinforcing cords constituting one of the belt layer are provided at an angle of 15° to 30° to the circumferential direction of the tire, while the reinforcing cords constituting the other layer are provided at an angle of 15° to 30° to the circumferential direction of the tire and cross the above-mentioned cords. Meanwhile the carcass plies comprises one or two layers. The cords constituting each layer of the carcass plies are provided at about 90° to the circumferential direction of the tire. The radial tire of this kind is superior in braking performance, fuel consumption, abrasion resistance, etc. to bias tires by virtue of the presence of the above-mentioned reinforcing belt layers. However, the radial tire has a problem that the stability during straight travelling is inferior. Specifically, when a radial tire is rotated and travelled, a lateral force is generated in either the left or the right direction with respect to the direction of travelling even in the case of a slip angle of zero degree. This lateral force often brings about the travelling of a vehicle in a direction different from that which the driver intends.

In general, the lateral force in the case of a slip angle of zero degree comprises two force components which occur through different mechanisms. One of the force components is called conicity (CT) while the other is called ply steer (PS), and the lateral force is categorized as part of the uniformity characteristics of a tire. In accordance with the testing method on uniformity of tires for automobiles (JASO C607), assuming that the average value of the lateral force required for making one revolution of a tire is LFD, the relationships represented by the following equations are established between LFDw which is a value as determined on one side of a tire, LFDs which is a value as determined on the other side of the tire after turn the tire inside out and the above-mentioned conicity (CT) and ply steer (PS):

$$LFDw = PS + CT \quad (1)$$

$$LFDs = PS - CT \quad (2)$$

From the above equations (1) and (2), PS and CT are given as follows:

$$CT = (LFDw - LFDs)/2 \quad (3)$$

$$PS = (LFDw + LFDs)/2 \quad (4)$$

Meanwhile it is believed that among the above-mentioned conicity and ply steer the conicity is a force which is generated when a tire having a geometrically asymmetrical shape as viewed in the circumferential direction of the tire, i.e., having a truncated cone shape, is rolled. The generation of this force is attributable mainly to the influence of the location of the belt layers which are inserted into the tread and the carcass layer of the tire. Therefore, it is possible to reduce the conicity through any improvement in the production of the tire. On the other hand, the ply steer is an inherent force attributable to the structure of the belt layers. Therefore, it is substantially impossible to reduce the ply steer unless the structure of the belt layers is changed.

SUMMARY OF THE INVENTION

An object of the present invention is to provide a radial tire having improved stability during straight travel without causing uneven tread wear by reducing the ply steer characteristic of conventional radial tires through modification of the shape of a tread block.

Specifically, in accordance with the present invention, there is provided a radial tire having at least two belt layers of which the cords between the plies cross each other and a block pattern formed on the tread area, wherein (1) part or the whole of the blocks present on the tread area have an angle 8 of the direction in which the maximum shear rigidity is attained relative to the circumferential direction of the tire in the range of 40° $\leq \theta \leq 75°$, (2) the direction in which the maximum shear rigidity of said block is attained and the direction of the cord of the outermost belt layer are opposite to each other with respect to the circumferential direction of the tire, (3) the ratio of the maximum shear rigidity of said block to the minimum shear rigidity of said block is in the range from 1.4 to 1.8, and (4) the total area of said block is 65% or more based on the total area of all the blocks.

The foregoing and other objects will be apparent from the following detailed description.

DETAILED DESCRIPTION OF THE PREFERRED EMBODIMENTS

Figure 9:
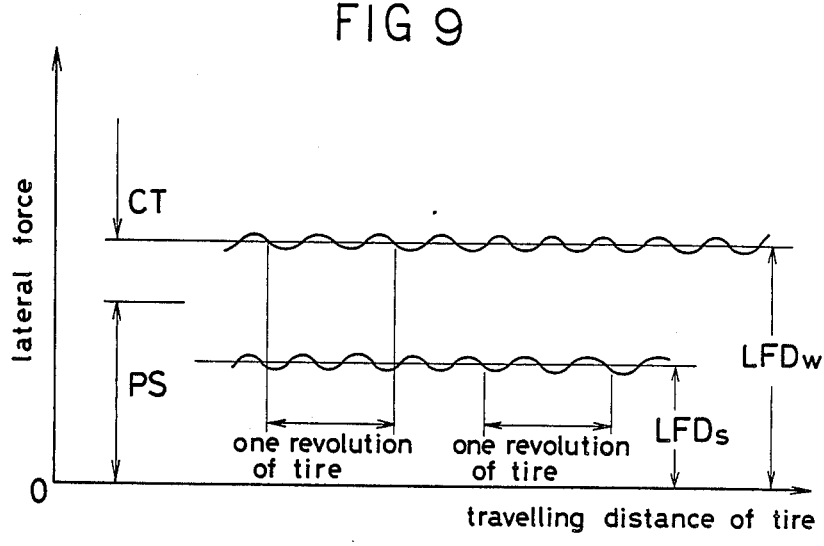
FIG. 9 is a view illustrating the relationship between the travelling distance of a tire and the lateral force.

The relationships between the above-mentioned equations (1), (2), (3), and (4) are shown in FIG. 9. In this case, the ply steer is an inherent force attributable to the structure of the belt plies and, as mentioned above, is not greatly reduced unless the structure of the belt plies itself is changed.

Figure 10:
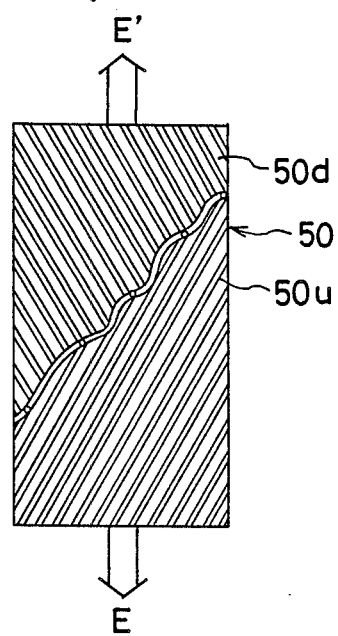
FIGS. 10(A) and (B) are each a view drawing of a model for the waveform of a belt layer.
Figure 10:
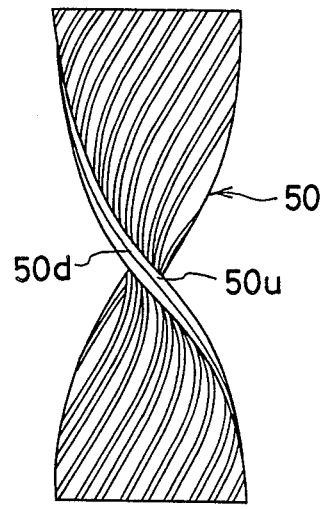

The belt plies will now be described in detail. As shown in FIG. 10(A), the belt plies is a double-layer laminated sheet 50 comprising belt layers 50u and 50d. It is known that when a tensile force is applied to the double layer laminated sheet 50 in the tire circumferential direction EE', the double-layer laminated sheet 50 is not only deformed within a two-dimensional plane but also is three-dimensionally deformed in the outside of the plane, which brings out the torsional deformation as shown in FIG. 10(B). The torsional deformation generates a ply steer.

Various studies have heretofore been made on the reduction in the ply steer through the addition of a belt reinforcing layer to the belt layer. For example, Japanese patent application Kokai Publication No. 60-234003 proposes the provision of a belt reinforcing layer on each of the upper and lower sides of the belt layer in order to reduce the ply steer. However, the addition of the belt reinforcing layers unfavorably spoils the advantages of the radial tire such as low fuel consumption. Meanwhile Japanese Patent Application Kokai Publication No. 57-114704 proposes the modification of a cord angle of the carcass layer. However, this method has a problem that the durability of the tire is lowered. Further, Japanese Patent Application Kokai Publication No. 54-55902 reduces the ply steer by providing the tread pattern in the direction opposite to the direction of the cords of the outermost belt layer. However, in this method, the definition on the direction of the tread pattern is unclear. Further, this method not only brings about no favorable effect when the block is of a certain shape but also unfavorably brings about uneven tread wear. Therefore, this method is unsatisfactory.

Under these circumstances, the present invention eliminated the above-mentioned drawbacks accompanying the prior art through the modification of the shape of the block of the tread area of the tire.

The constitution of the present invention will now be described in detail with reference to the drawings.

Figure 1:
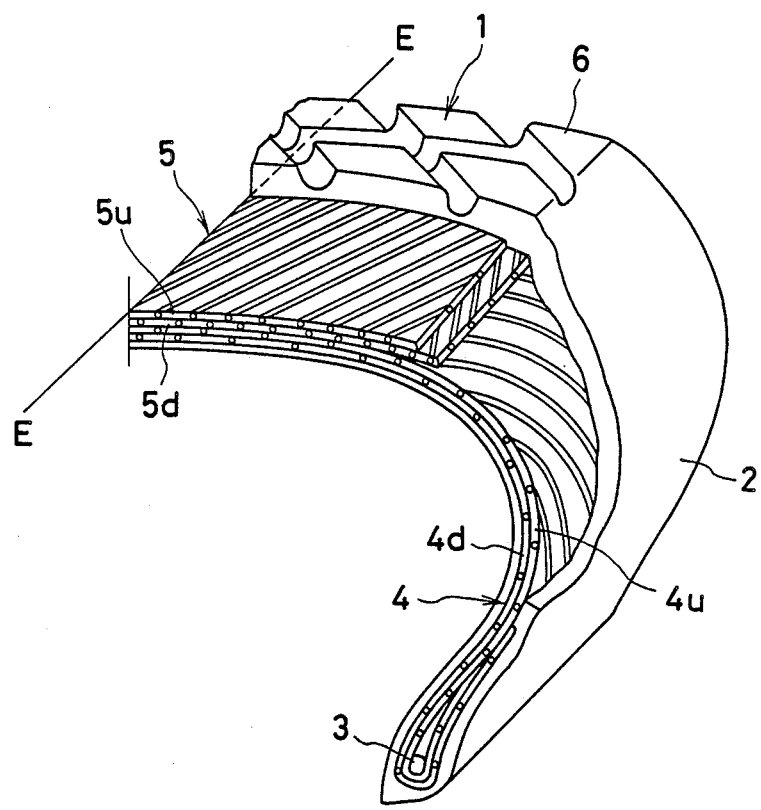
FIG. 1 is a partially cutaway half sectional perspective view of one form of the radial tire according to the present invention.

In FIG. 1, numeral 1 represents a tread, numeral 2 represents sidewalls provided so as to extend to both sides of the tread 1, and numeral 3 represents bead wires embedded in the lower end portions of the sidewalls 2 along the tire circumferential direction EE'. A carcass layer 4 is provided so as to wrap the bead wires 3 in the both end portions and along the internal side of the sidewalls 2 and tread 1. Further, a belt layer 5 is interposed between the carcass layer 4 and the tread 1. The carcass layer 4 comprises two layers, i.e., an upper carcass layer 4u and a lower carcass layer 4d. Often, the carcass layer comprises only one layer. The belt layer 5 also comprises two layers, i.e., an upper belt layer 5u and a lower belt layer 5d.

Examples of the material constituting the carcass layer include nylon, polyester, rayon, and aromatic polyamide.

In the belt layer 5, the cords of each layer cross each other. Specifically, the cords constituting the upper belt layer 5u and the cords constituting the lower belt layer 5d cross each other.

A block pattern comprising a plurality of blocks 6 is formed on the tread area of the tire.

Further, in order to improve the high speed durability, a covering layer made of nylon cords arranged at an angle of substantially zero degree relative to the tire circumferential direction EE' may be provided between the upper belt layer 5u and the tread 1.

In the present invention, the following requirements were specified on the part or the whole of the blocks 6 of the tire as shown in FIG. 1.

(1) The angle $\theta$ of the direction in which the maximum shear rigidity on the blocks 6 of the tread area of the tire is attained relative to the tire circumferential direction EE' is in the range of $40° \leq \theta \leq 75°$.

Figure 2:
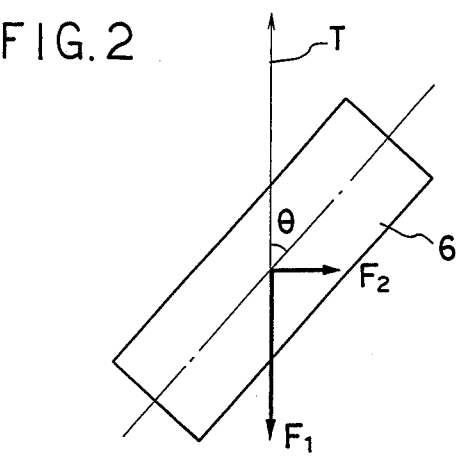
FIG. 2 is a view illustrating the direction of the stress which is generated when a driving force is applied to the blocks of the tread area of a tire.

When a driving force T is applied to the block 6 provided at an angle of $\theta$ relative to the direction of the travelling (the tire circumferential direction EE') as shown in FIG. 2, the block 6 undergoes oblique deformation in the direction in which the shear rigidity is low rather than straight deformation in the direction of the driving force T. For this reason, in the block 6, there are generated not only a force $F_1$ which is a reaction in the direction opposite to the driving force T but also a lateral force $F_2$.

Figure 3:
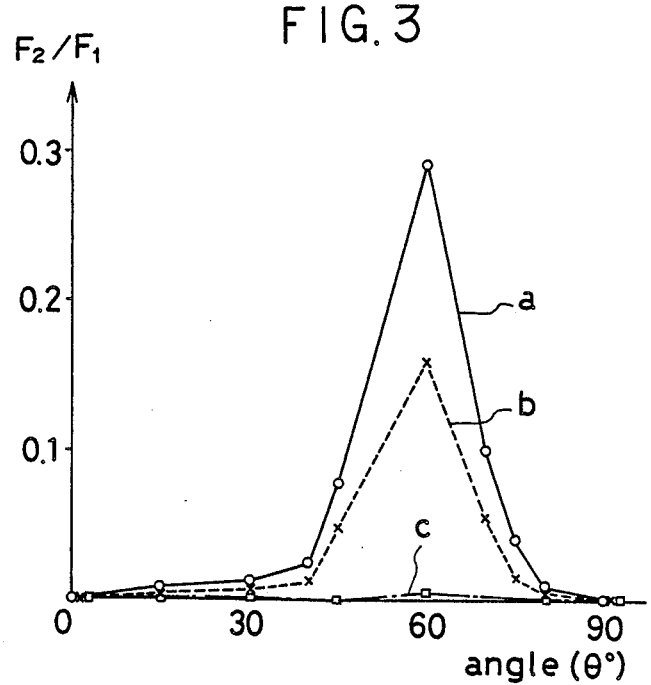
FIG. 3 is a graph showing the relationship between the angle of the direction in which the maximum shear rigidity of the block is attained relative to the direction of the driving force and $F_2/F_1$ as shown in FIG. 2.

Accordingly, as shown in FIG. 3, the angle $\theta$ of the direction in which the maximum shear rigidity of the block 6 is attained relative to the tire circumferential direction EE' (which is the same as the angle of inclination of the block 6 relative to the tire circumferential direction EE') was varied in the range from 0° to 90°, followed by determination of the magnitude of $F_1$ and $F_2$. As a result, it was found that the $F_2/F_1$ value is large when the angle is in the range of $40° \leq \theta \leq 75°$. A preferable angle is in the range of $50° \leq \theta \leq 70°$. In FIG. 3, a is a graph in the case of $C_0(MAX)/C_0(MIN)$ of 1.9, b is a graph in the case of $C_0(MAX)/C_0(MIN)$ of 1.6, and c is a graph in the case of $C_0(MAX)/C_0(MIN)$ of 1.1. The $C_0(MAX)$ is defined as the maximum value of the values of the shear rigidity obtained by determining the shear rigidity of the block at each angle while rotating the block by 360°. On the other hand, the $C_0(MIN)$ is defined as the minimum value of the values of the shear rigidity obtained by determining the shear rigidity of the block at each angle while rotating the block by 360°.

The shear rigidity of the block 6 can be determined, e.g., by using a Rotating Disc Friction Tester manufactured by Iwamoto Seisakusho K. K. under the following conditions: a vertical load of 6 kg; a travelling velocity of 160 cm/h; a temperature of 25° C.; and use of Safety Walk as the road surface.

(2) The direction in which the maximum shear rigidity of the block 6 is attained and the direction of the cords of the outermost belt layer (upper belt layer 5u) are opposite to each other with respect to the tire circumferential direction EE'.

Figure 4:
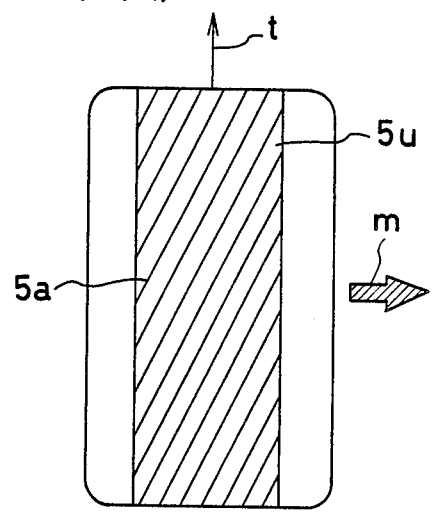
FIG. 4(A) is a view illustrating a ply steer which is generated in the belt layer during travelling of a tire.
FIG. 4(B) is a view illustrating a lateral force which is generated in the block against the driving force.
Figure 4:
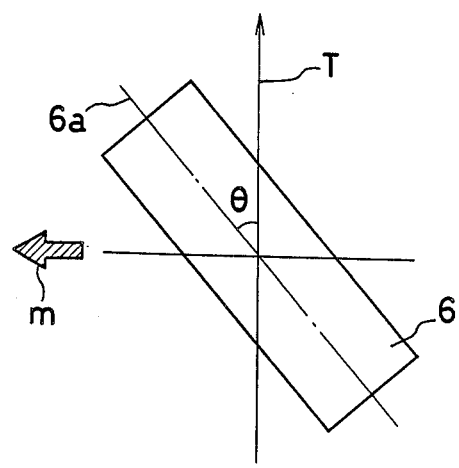

When the structure of the belt is a bias laminated structure, the application of a force to the belt portion brings about not only two-dimensional deformation within the plane of the belt but also torsional deformation in the outside of the plane of the belt. In the tire, this kind of deformation is suppressed by pressing the tire against a flat road surface. Therefore, the center line of the tire in the contact area is deviated from the direction of travelling, which causes a slight slip angle when the tire is rotated. This leads to the generation of a lateral force m with respect to the direction of travelling of the tire t (which is the direction of the driving force T and the same as the direction of the tire circumferential direction EE') as shown in FIG. 4(A). This lateral force m is called ply steer. In the case of a bias laminated structure, the direction of the force depends on the direction of the cords 5a of the outermost belt layer (upper belt layer 5u).

In the present invention, the direction 6a in which the maximum shear rigidity of the block 6 is attained and the direction 5a of the cords of the outermost belt layer (upper belt layer 5u) were made opposite to each other with respect to the tire circumferential direction EE', which enabled the ply steer to be negated by means of a lateral force of the block 6, thereby improving the stability during straight travelling.

(3) The ratio of the maximum shear rigidity of the block 6 to the minimum shear rigidity of the block 6 is in the range of 1.4 to 1.8.

The magnitude of the lateral force $F_2$ as shown in FIG. 2 depends on the ratio of the maximum shearing rigidity of the block 6 to the minimum shear rigidity of the block 6 and rapidly increases when the ratio is 1.4 or more.

Therefore, the higher the ratio of the maximum shear rigidity to the minimum shear rigidity, the higher the ratio of the driving force T to the lateral force m and the greater the reduction of the ply steer. However, the higher the ratio, the greater the uneven tread wear. Therefore, in the present invention, the upper limit of the ratio is 1.8, and a preferable ratio is in the range of 1.4 to 1.6.

(4) The total area of the block 6 is 65% or more of the total area of all the blocks.

When the total area of the block 6 is less than 65%, the total of all the lateral forces rapidly lowers even if the lateral force of individual blocks is great, which contributes to neither the reduction of the ply steer nor the improvement in uneven tread wear resistance. Even when other blocks were provided by less than 35% of the total area of all the blocks, the entire lateral force of the contact area can be directed to a predetermined direction.

The present invention will now be described with reference to Examples and Comparative Examples.

Figure 6:
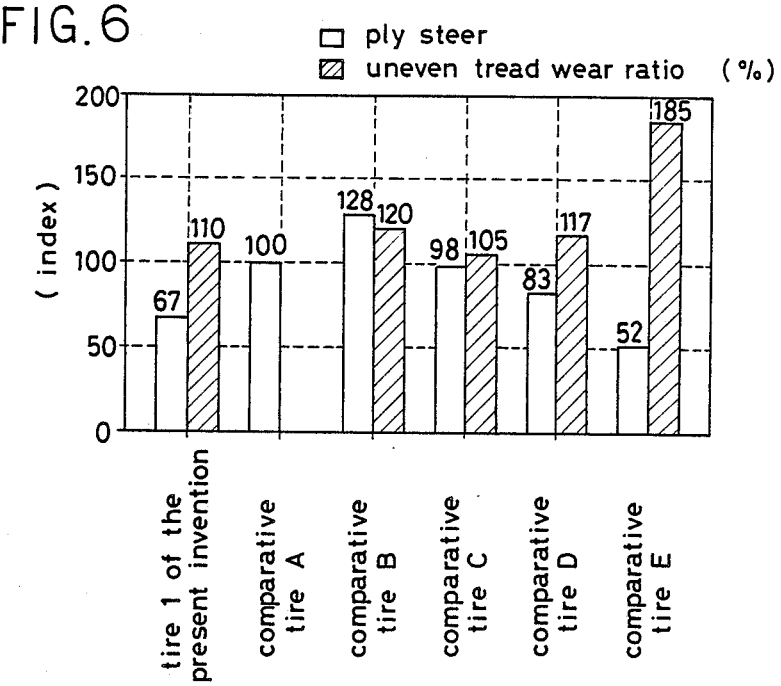
FIGS. 6 and 7 are each a graph illustrating the ply steer and uneven tread wear ratio on various tires.

EXAMPLE AND COMPARATIVE EXAMPLES (1) Test were conducted with respect to the ply steer and uneven tread wear ratio of the following tires. The results are shown in FIG. 6. The proportion of the area of the block according to the present invention in the total area of all the blocks is expressed in terms of SH (%).

Figure 5:
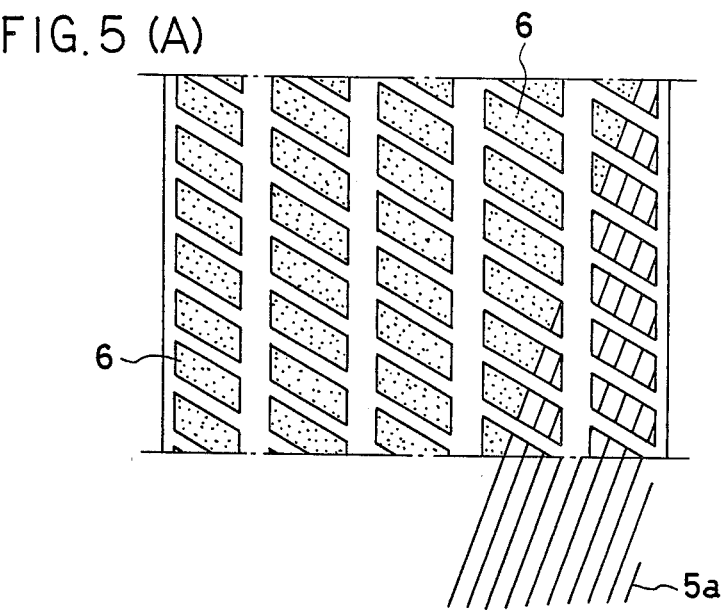
FIGS. 5(A) to (E) are each a view illustrating a block pattern of the tread area of a tire.
Figure 5:
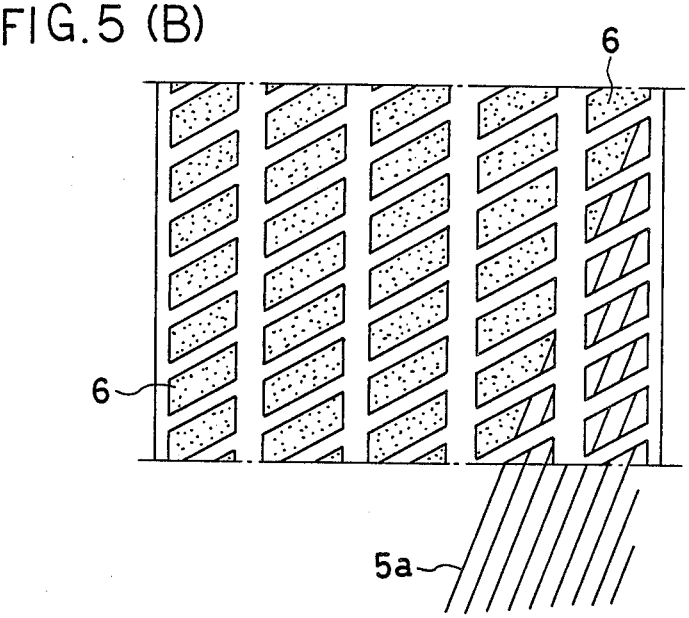

(a) Tire 1 of the present invention:
Size of tire: 185/70 SR 13
Rim: 5J×13
Carcass layer: one formed by providing polyester cords of 1500 D/2 at an angle of substantially 90° relative to the circumferential direction of the tire.
Belt layer: a double-layer structure comprising two layers made of steel cords 1×5 (0.25) which are provided at an angle of 20° relative to the circumferential direction of the tire and cross each other.
Block pattern: one as shown in FIG. 5(A).
Angle $\theta$ of the direction 6a in which the maximum shear rigidity of the block 6 is attained relative to the circumferential direction of the tire EE': 60°.
The direction 6a in which the maximum shear rigidity of the block 6 is attained and the direction 5a of the cords of the upper belt layer 5u are opposite to each other with respect to the tire circumferential direction EE'.
Maximum shear rigidity/minimum shear rigidity ratio: 1.5.

SH=100%

(b) Comparative tire A:
Size of tire: 185/70 SR 13
Rim: 5J×13
Carcass layer: one formed by providing polyester cords of 1500 D/2 at an angle of substantially 90° relative to the circumferential direction of the tire.
Belt layer: a double-layer structure comprising two layers made of steel cords 1×5 (0.25) which are provided at an angle of 20° relative to the circumferential direction of the tire and cross each other. A smooth tire free from a block pattern on the tread area.

(c) Comparative tire B:
Size of tire: 185/70 SR 13
Rim: 5J×13
Carcass layer: one formed by providing polyester cords of 1500 D/2 at an angle of substantially 90° relative to the circumferential direction of the tire.
Belt layer: a double-layer structure comprising two layers made of steel cords 1×5 (0.25) which are provided at an angle of 20° relative to the circumferential direction of the tire and cross each other.
Block pattern: one as shown in FIG. 5(B).
Angle $\theta$ of the direction 6a in which the maximum shear rigidity of the block 6 is attained relative to the tire circumferential direction EE': 60°.
The direction 6a in which the maximum shear rigidity of the block 6 is attained and the direction 5a of the cords of the upper belt layer 5u are the same with respect to the tire circumferential direction EE'.
Maximum shear rigidity/minimum shear rigidity ratio: 1.5.

SH=0%.

(d) Comparative tire C:

Size of tire: 185/70 SR 13

Rim: 5J×13

Figure 5C:
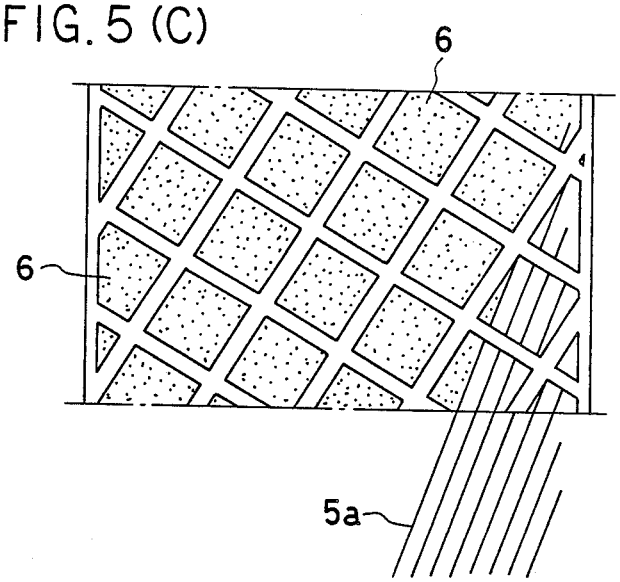

Carcass layer: one formed by providing polyester cords of 1500 D/2 at an angle of substantially 90° relative to the circumferential direction of the tire.
Belt layer: a double-layer structure comprising two layers made of steel cords 1×5 (0.25) which are provided at an angle of 20° relative to the circumferential direction of the tire and cross each other.
Block pattern: one as shown in FIG. 5(C).
Angle $\theta$ of the direction 6a in which the maximum shear rigidity of the block 6 is attained relative to the tire circumferential direction EE': 60°.
The direction 6a in which the maximum shear rigidity of the block 6 is attained and the direction 5a of the cords of the upper belt layer 5u are opposite to each other with respect to the tire circumferential direction EE'.
Maximum shear rigidity/minimum shear rigidity ratio: 1.1.

SH=0%.

The value is the same as that of the comparative tire B and is 0%.

(e) Comparative tire D:
Size of tire: 185/70 SR 13
Rim: 5J×13
Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Figure 5D:
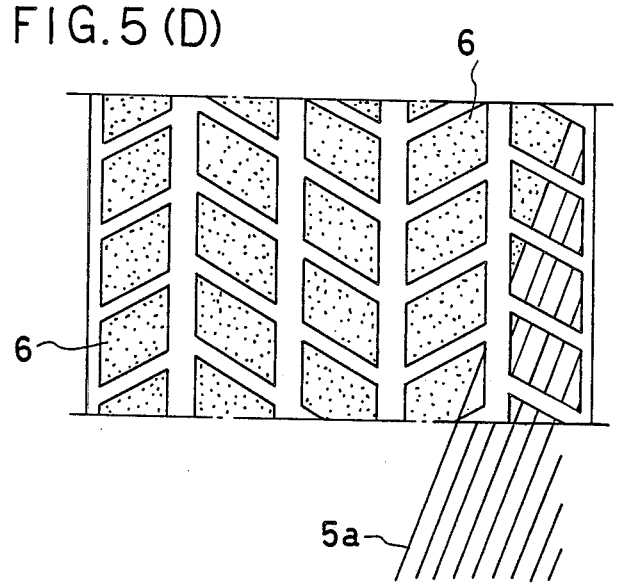
Figure 5:
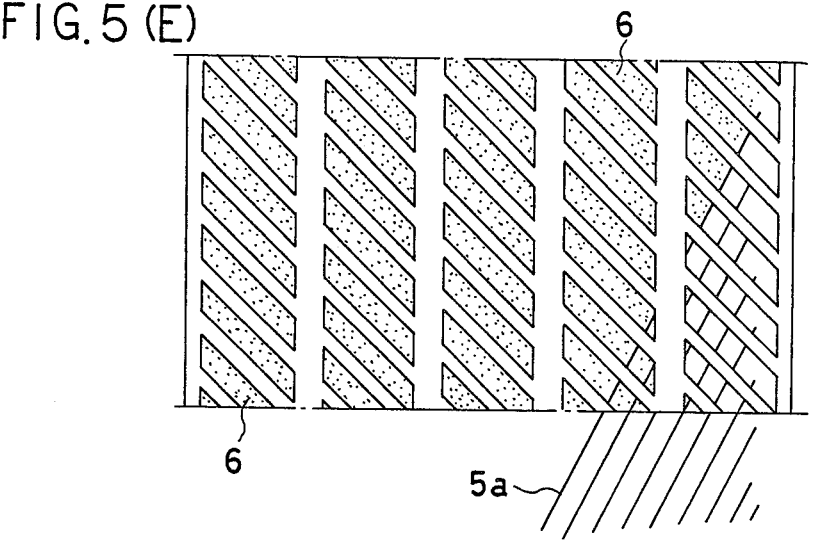

Block pattern: one as shown in FIG. 5(D).

Angle $\theta$ of the direction 6a in which the maximum shear rigidity of the block 6 is attained relative to the circumferential direction of the tire EE': 60°.

The direction 6a in which the maximum shear rigidity of the block 6 is attained and the direction 5a of the cords of the upper belt layer 5u are opposite to each other with respect to the tire circumferential direction EE': 60%.

The direction 6a in which the maximum shearing stiffness of the block 6 is attained and the direction 5a of the cords of the upper belt layer 5u are the same with respect to the tire circumferential direction EE': 40%.

Maximum shear rigidity/minimum shear rigidity ratio: 1.4.

SH=60%.

(f) Comparative tire E:
Size of tire: 185/70 SR 13
Rim: 5J×13
Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(E).

Angle $\theta$ of the direction 6a in which the maximum shear rigidity of the block 6 is attained relative to the circumferential direction of the tire EE': 45°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.85.

SH=0%.

DETERMINATION OF PLY STEER

The ply steer was determined according to the uniformity testing method as specified in JASO C607.

DETERMINATION OF UNEVEN TREAD WEAR RATIO

The tires except for comparative tire A were applied to a travelling test using an actual automobile mainly on an ordinary flat road. After travelling of 10,000 km, the tire profile was examined with a laser, and an uneven tread wear ratio was determined by calculating the ratio of the average abrasion quantity of the cross-sectional direction (width direction of the tire) of the equally divided four points on the circumference relative to the average abrasion quantity of the block in the circumferential direction through comparison with the state before travelling.

Figure 8:
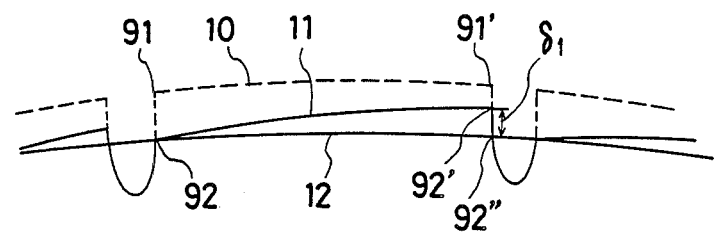
FIG. 8(A) is a view illustrating a cross section of the tire in the circumferential direction thereof.
FIG. 8(B) is a view illustrating a cross section of the tire in the width direction thereof.
Figure 8:
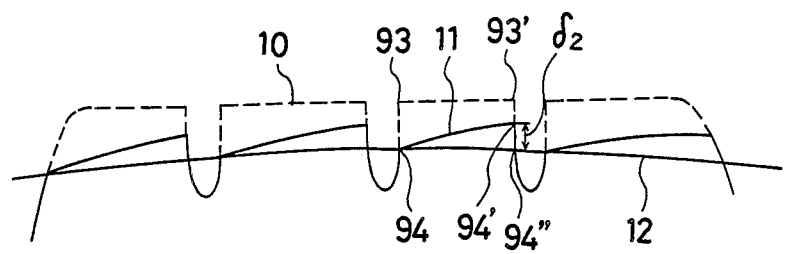

FIG. 8(A) is a drawing illustrating the cross section of the tire in the circumferential direction thereof, and FIG. 8(B) is a drawing illustrating the cross section of the tire in the width direction thereof. In FIGS. 8(A) and (B), numeral 10 is a fresh block surface before travelling, numeral 11 is a block surface which has been unevenly abraded, and numeral 12 is a block surface which has been evenly abraded. In FIG. 8(A), when the block surface is evenly abraded, rib edges 91, 91' of the fresh block surface 10 are shifted to rib edges 92, 92" of the block surface, respectively, while when the rib edge 91 of the block surface 10 is unevenly abraded, the rib edge 91' is shifted to a rib edge 92' of the block surface 11. $\delta_1$ is the difference in shift between the rib edge 92" of the block surface 12 and the rib edge 92' of the block surface 11. Similarly, in FIG. 8(B), when the block surface is evenly abraded, rib edges 93, 93' of the fresh block surface 10 are shifted to rib edges 94, 94" of the block surface 12, respectively, while when the rib edge 93' of the block surface 10 is unevenly abraded the rib edge 93' is shifted to rib edge 94' of the block surface 11. $\delta_2$ is the difference in shift between the rib edge 94" of the block surface 12 and the rib edge 94' of the block surface 11. Accordingly, the uneven tread wear ratio is $\delta_1/\delta_2$ when $\delta_1 \geq \delta_2$, and $\delta_2/\delta_1$ when $\delta_1 < \delta_2$, so that the uneven tread wear ratio is always greater than 1.

As can be seen from FIG. 6, the ply steer of the tire of the present invention is clearly less than that of the conventional tire A as the smooth tire. In the case of a tire having a maximum shear rigidity/minimum shear rigidity ratio of 1.1 (comparative tire C), no significant change in the magnitude of the ply steer is observed as compared with the comparative tire A. Further, in the comparative tire D, a clear reduction in the ply steer is observed. However, the extent of the reduction is not remarkable as compared with that attained by the tire of the present invention. In the comparative tire E, the reduction of the ply steer is greater than that of the tire of the present invention. However, the uneven tread wear ratio is unfavorably remarkably increased.

Figure 7:
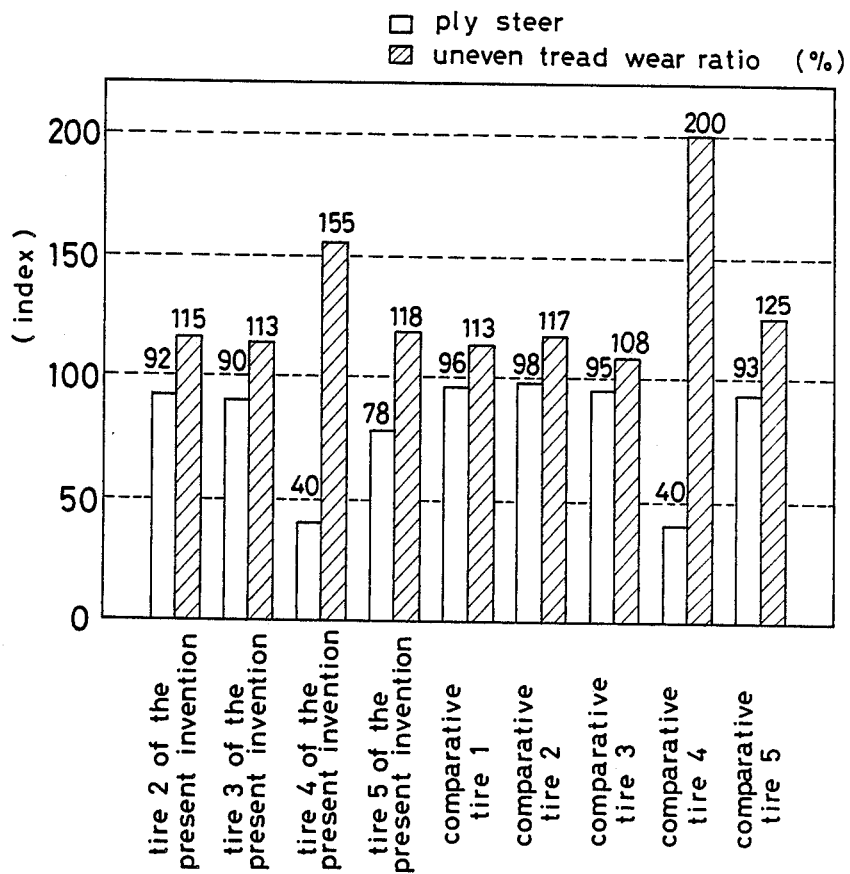

(2) Tests on ply steer and uneven tread wear ratio were conducted with respect to the following tires in the same manner as mentioned in the above item (1). The results are shown in FIG. 7.

(a) Tire 2 of the present invention:
Size of tire: 185/70 SR 13
Rim: 5J×13
Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the tire circumferential direction EE': 40°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.5.

SH=100%.

(b) Tire 3 of the present invention:
Size of tire: 185/70 SR 13
Rim: 5J×13

Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the circumferential direction of the tire EE': 75°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.5.

SH=100%.

(c) Tire 4 of the present invention:
Size of tire: 185/70 SR 13
Rim: 5J×13
Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the circumferential direction of the tire EE': 60°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.8.

SH=100%.

(d) Tire 5 of the present invention:
Size of tire: 185/70 SR 13
Rim: 5J×13
Carcass layer: one formed by providing polyester cords of 1500 D/2 at an angle of substantially 90 ° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the circumferential direction of the tire EE': 60°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.5.

SH=65%.

(e) Comparative tire 1:
Size of tire: 185/70 SR 13
Rim: 5J×13
Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the circumferential direction of the tire EE': 35°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.5.

SH=0%.

(f) Comparative tire 2:
Size of tire: 185/70 SR 13
Rim: 5J×13
Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the circumferential direction of the tire EE': 80°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.5.

SH=0%.

(g) Comparative tire 3:
Size of tire: 185/70 SR 13
Rim: 5J×13
Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the circumferential direction of the tire EE': 60°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.2.

SH=0%.

(h) Comparative tire 4:
Size of tire: 185/70 SR 13
Rim: 5J×13

Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the tire circumferential direction EE': 60°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 2.0.

SH=0%.

(i) Comparative tire 5:
Size of tire: 185/70 SR 13
Rim: 5J×13

Carcass layer: one formed by providing polyester cords of 1500 D/2 at an angle of substantially 90° relative to the circumferential direction of the tire.

Belt layer: a double-layer structure comprising two layers made of steel cords 1×5 (0.25) which are provided at an angle of 20° relative to the circumferential direction of the tire and cross each other.

Block pattern: one as shown in FIG. 5(A).

Angle $\theta$ of the direction 6a in which the maximum shear rigidity of the block 6 is attained relative to the tire circumferential direction EE': 60°.

The direction 6a in which the maximum shear rigidity of the block 6 is attained and the direction 5a of the cords of the upper belt layer 5u are opposite to each other with respect to the tire circumferential direction EE'.

Maximum shear rigidity/minimum shear rigidity ratio: 1.5.

SH=60%.

As can be seen from FIG. 7, the tires 2 to 5 of the present invention are excellent in ply steer and uneven tread wear ratio as compared with the comparative tires 1 to 5.

As is apparent from the foregoing description, according to the present invention, the ply steer can be reduced without sacrificing the uneven tread wear resistance. Therefore, the tire of the present invention can greatly contribute to the improvement in stability during straight travelling and driving stability of automobiles.

We claim:

1. A radial tire having at least two belt layers of which the cords cross each other and a tread pattern formed by a plurality of blocks on the tread area with each block having a shear rigidity and each block being formed between circumferential grooves and lateral grooves, wherein (1) certain ones of said plurality of blocks having an axis oriented at an angle $\theta$ of the direction in which the maximum shear rigidity is attained relative to the circumferential direction of the tire in the range of $40° \leq \theta \leq 75°$, (2) the direction in which the maximum shear rigidity of said certain ones of said blocks is attained and the direction of the cords of the outermost belt layer are opposite to each other with respect to the circumferential direction of the tire, (3) the ratio of the maximum shear rigidity of said certain ones of said blocks to the minimum shear rigidity of said certain ones of said blocks is in the range 1.4 to 1.8, and (4) the total surface area of said certain ones of said blocks is 65% or more of the total surface area of said plurality of blocks.

2. A radial tire according to claim 1, wherein said angle $\theta$ is in the range of $50° \leq \theta \leq 70°$.

3. A radial tire according to claim 1, wherein the ratio of the maximum shear rigidity of said certain ones of said blocks to the minimum shear rigidity of said certain ones of said blocks is in the range of from 1.4 to 1.6.

4. A radial tire according to claim 1, wherein said certain ones of the plurality of blocks comprise four-sided blocks having opposite parallel sides.

* * * * *